(12) United States Patent
Imamura et al.

(10) Patent No.: US 10,836,373 B2
(45) Date of Patent: Nov. 17, 2020

(54) CONTROL SYSTEM FOR HYBRID VEHICLE

(71) Applicant: TOYOTA JIDOSHA KABUSHIKI KAISHA, Toyota (JP)

(72) Inventors: Tatsuya Imamura, Okazaki (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 15/870,325

(22) Filed: Jan. 12, 2018

(65) Prior Publication Data
US 2018/0201251 A1    Jul. 19, 2018

(30) Foreign Application Priority Data

Jan. 13, 2017  (JP) ................................. 2017-004472

(51) Int. Cl.
| | |
|---|---|
| *B60W 20/15* | (2016.01) |
| *B60W 10/08* | (2006.01) |
| *B60W 10/06* | (2006.01) |
| *B60K 6/387* | (2007.10) |

(Continued)

(52) U.S. Cl.
CPC ............ *B60W 20/15* (2016.01); *B60K 6/365* (2013.01); *B60K 6/387* (2013.01); *B60K 6/445* (2013.01); *B60W 10/026* (2013.01); *B60W 10/06* (2013.01); *B60W 10/08* (2013.01); *B60W 20/10* (2013.01); *B60K 6/36* (2013.01);
(Continued)

(58) Field of Classification Search
CPC .... B60W 20/10; B60W 20/15; B60W 10/026; B60W 10/06; B60W 10/08; B60W 2710/081; B60W 2710/025; B60K 6/365; B60K 6/445; B60K 6/387; B60K 6/36; B60K 6/442; B60K 2006/381; Y02T 10/6239; Y02T 10/6295; Y02T 10/6286; B60Y 2400/426; B60Y 2400/424; Y10S 903/914; Y10S 903/909; F16H 45/02
See application file for complete search history.

(56) References Cited

U.S. PATENT DOCUMENTS

| | | | |
|---|---|---|---|
| 2006/0111213 A1 | 5/2006 | Bucknor et al. | |
| 2007/0256870 A1* | 11/2007 | Holmes ................. | B60K 6/445 180/65.26 |

(Continued)

FOREIGN PATENT DOCUMENTS

| | | |
|---|---|---|
| CN | 101107460 A | 1/2008 |
| JP | 2006070979 A | 3/2006 |

(Continued)

*Primary Examiner* — Aaron L Troost
(74) *Attorney, Agent, or Firm* — Hunton Andrews Kurth LLP

(57) ABSTRACT

A control system for hybrid vehicles configured to improve energy efficiency by controlling a speed difference in a coupling. The hybrid vehicle comprises: a power split mechanism; an engine connected to a first rotary element; a first motor connected to the second rotary element; a second motor connected to the third rotary element; drive wheels to which a torque is delivered from the third rotary element; and a coupling comprising a drive member and a driven member. A controller is configured to change the speed difference in the coupling, and to change a speed or a torque of at least one of the first motor and the second motor after changing the speed difference in the coupling.

6 Claims, 8 Drawing Sheets

(51) Int. Cl.
*B60W 10/02* (2006.01)
*B60W 20/10* (2016.01)
*B60K 6/445* (2007.10)
*B60K 6/365* (2007.10)
*B60K 6/442* (2007.10)
*B60K 6/36* (2007.10)
*F16H 45/02* (2006.01)
*B60K 6/38* (2007.10)

(52) U.S. Cl.
CPC ........ *B60K 6/442* (2013.01); *B60K 2006/381* (2013.01); *B60W 2710/025* (2013.01); *B60W 2710/06* (2013.01); *B60W 2710/081* (2013.01); *B60W 2710/083* (2013.01); *B60Y 2200/92* (2013.01); *B60Y 2400/424* (2013.01); *B60Y 2400/426* (2013.01); *F16H 45/02* (2013.01); *Y02T 10/6239* (2013.01); *Y02T 10/6286* (2013.01); *Y02T 10/6295* (2013.01); *Y10S 903/909* (2013.01); *Y10S 903/914* (2013.01); *Y10S 903/93* (2013.01)

(56) References Cited

U.S. PATENT DOCUMENTS

| | | | |
|---|---|---|---|
| 2007/0275823 A1* | 11/2007 | Motosugi | B60K 6/48 477/176 |
| 2008/0004156 A1 | 1/2008 | Tabata et al. | |
| 2010/0204011 A1* | 8/2010 | Iraha | F16H 61/143 477/175 |
| 2015/0021110 A1 | 1/2015 | Ono et al. | |
| 2015/0197232 A1* | 7/2015 | Heap | B60W 10/06 701/22 |
| 2017/0015298 A1 | 1/2017 | Imamura et al. | |

FOREIGN PATENT DOCUMENTS

| | | |
|---|---|---|
| JP | 2011223681 A | 11/2011 |
| JP | 2017-020574 A | 1/2017 |
| WO | 2013-114594 A1 | 8/2013 |

\* cited by examiner

|  |  |  | B1 | MG1 | MG2 |
|---|---|---|---|---|---|
| EV | Forward/Reverse | Single Motor Mode |  |  | M |
|  |  | Dual Motor Mode | O | M | M |
| HV | Forward |  |  | G | M |
|  | Reverse |  |  | G | M |

O: Engage      Blank: Disengage or Stop
G: Mainly Generator    M: Mainly Motor but Occasionally Generator

CONTROL SYSTEM FOR HYBRID VEHICLE

CROSS REFERENCE TO RELATED APPLICATIONS

The present disclosure claims the benefit of Japanese Patent Application No. 2017-004472 filed on Jan. 13, 2017 with the Japanese Patent Office, the disclosure of which are incorporated herein by reference in its entirety.

BACKGROUND

Field of the Disclosure

Embodiments of the present disclosure relate to the art of a control system for a hybrid vehicle in which a prime mover includes at least two kinds of prime movers.

Discussion of the Related Art

PCT International Publication WO 2013/114594 describes one example of a driving device for hybrid vehicle. A driving device taught by WO 2013/114594 comprises a power split mechanism including a first rotary element to which an engine torque is applied, a second rotary element connected to a first motor-generator, and a third rotary element serving as an output element. According to the teachings of WO 2013/114594, a torque generated by a second motor-generator may be added to a torque delivered from the third rotary element to drive wheels according to need. A power transmission mechanism a gear stage thereof is shifted between high and low is disposed between the first rotary element and an engine to change the engine speed at a predetermined vehicle speed.

According to the teachings of WO 2013/114594, the engine speed may be changed by the first motor-generator. Especially, in a high speed range, the engine speed can be lowered to save fuel by reducing a speed ratio of the power transmission mechanism.

In the driving device taught by WO 2013/114594, specifically, the power split mechanism performs a relative rotation among the rotary elements to distribute torque, and the power transmission mechanism also performs a relative rotation among rotary elements to transmit torque with a desired speed ratio. That is, in the driving device taught by WO 2013/114594, a speed and an operating point of the engine are controlled by both of the power split mechanism and the power transmission mechanism. For this reason, a size of the driving device taught by WO 2013/114594 may be increased. In addition, a power loss resulting from the relative rotations of the power split mechanism and the power transmission mechanism may be increased with an increase in the relative rotation speed or a transmission torque. In other words, an energy efficiency may be reduced. Further, in the driving device taught by WO 2013/114594, relative rotational speeds in the power split mechanism and the power transmission mechanism at a predetermined vehicle speed are structurally limited. That is, the power loss may not be reduced to improve energy efficiency by a control.

SUMMARY

Aspects of embodiments of the present disclosure have been conceived noting the foregoing technical problems, and it is therefore an object of the present disclosure is to provide a control system for hybrid vehicles to control an operating point of a power split mechanism so as to improve energy efficiency.

A control system according to the embodiment of the present disclosure is applied to a hybrid vehicle, comprising: a power split mechanism that performs a differential action among a first rotary element, a second rotary element, and a third rotary element; an engine that is connected to the first rotary element; a first motor that is connected to the second rotary element; a second motor that is connected to the third rotary element; and drive wheels to which a torque is delivered from the third rotary element. In order to achieve the above-explained objective, according to the embodiment, the control system comprises: a coupling comprising a drive member to which the torque of the third rotary element is applied and a driven member that delivers the torque to the drive wheels, in which a speed difference between the drive member and the driven member can be controlled; and a controller that controls the first motor, the second motor, and the coupling. Specifically, the controller is configured to change the speed difference in the coupling, and to change a speed or a torque of at least one of the first motor and the second motor with changing the speed difference in the coupling.

In a non-limiting embodiment, the controller may be further configured to change the speed difference in the coupling and the speed or the torque of at least one of the first motor and the second motor in such a manner that a total efficiency of: a power transmission efficiency of the coupling changed by changing the speed difference therein; and a power transmission efficiency of the power split mechanism changed by a change in an operating condition thereof resulting from changing the speed difference in the coupling, is improved from the prior total efficiency before the operating condition of the power split mechanism is changed by the change in the speed difference in the coupling.

In a non-limiting embodiment, the engine may be operated along an optimum fuel efficient curve. In addition, the controller may be further configured to change the speed or the torque of the first motor while maintaining an operating point of the engine on the optimum fuel efficient curve.

In a non-limiting embodiment, the hybrid vehicle may comprise a countershaft to which the torque is delivered from the third rotary element, and a final reduction that distributes the torque to the right drive wheel and the left drive wheel. In addition, The coupling may be disposed coaxially with the countershaft between the countershaft and the final reduction.

In a non-limiting embodiment, the coupling may include a fluid coupling having a frictional lockup clutch that connects the drive member to the driven member. In addition, the controller may be further configured to control the speed difference in the coupling by causing a slip in the lockup clutch.

According to the embodiment, the engine torque is delivered the drive wheels through the power split mechanism and the coupling, therefore, energy efficiency may be affected by power losses in the power split mechanism and the coupling. However, even if the power loss in the coupling is increased by changing the speed difference therein, the power loss in the power split mechanism can be reduced by changing the operating condition of the power split mechanism by changing the speed or the torque of the first motor or the second motor when changing the sped difference in the coupling. According to the embodiment, therefore, the total efficiency can be improved.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
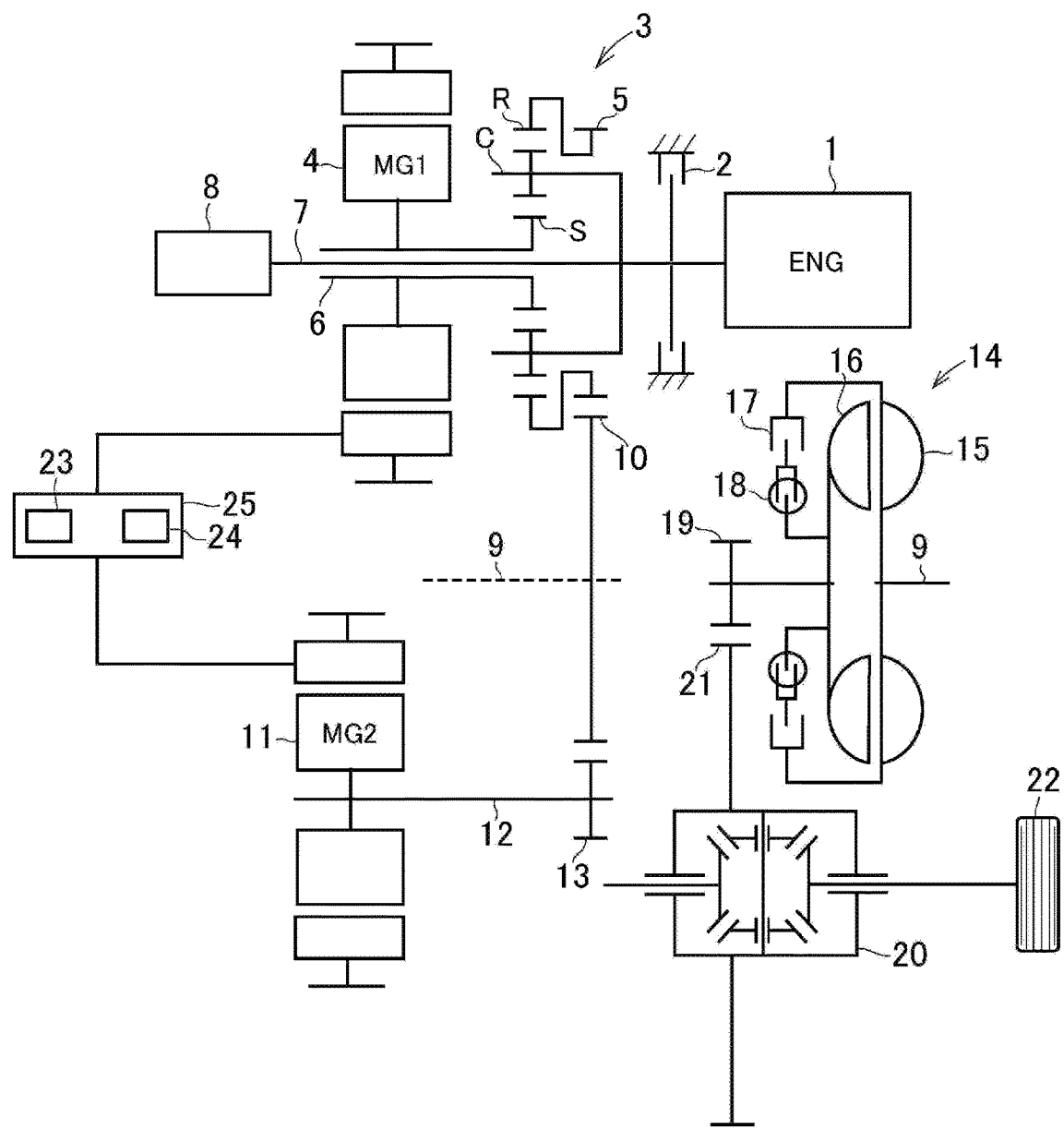
FIG. 1 is a schematic illustration showing one example of a gear train of the hybrid vehicle to which the control system according to the embodiment is applied.

Embodiments of the present disclosure will now be explained with reference to the accompanying drawings. Turning now to FIG. 1, there is shown an example of a gear train of a hybrid vehicle to which the control system according to the embodiment is applied. As illustrated in FIG. 1, in the gear train, an engine (referred to as "ENG" in FIG. 1) 1, a brake 2, a power split mechanism 3, a first motor (referred to as "MG1" in FIG. 1) 4 are arranged coaxially. For example, an internal combustion engine such as a gasoline engine and a diesel engine may be used as the engine 1. The brake 2 is disposed to selectively stop a rotation of an output shaft of the engine or a member connected thereto, and for example, a friction brake or a dog brake actuated hydraulically or electromagnetically may be used as the brake 2.

A single-pinion planetary gear unit adapted to perform a differential action among three rotary elements may be employed as the power split mechanism 3. Specifically, the power split mechanism 3 comprises a sun gear S as a second rotary element, a ring gear R as a third rotary element that is arranged coaxially around the sun gear S, a plurality of pinion gears interposed between the sun gear S and the ring gear R, and a carrier C as a first rotary element that supports the pinion gears in a rotatable manner. In the power split mechanism 3, the carrier C is connected to the engine 1, and the ring gear R is connected to an output gear 5 to serve as an output element. The sun gear S is formed integrally around a hollow sun gear shaft 6 connected to a rotor of the first motor 4 so that the sun gear S serves as a reaction element.

An intermediate shaft 7 penetrates through the sun gear shaft 6. One end of the intermediate shaft 7 is connected to the carrier C or the output shaft of the engine 1, and other end the intermediate shaft 7 is connected to an oil pump 8 as a mechanical pump that is drive by a torque of the engine 1.

A countershaft 9 extends parallel to the intermediate shaft 7, and a driven gear 10 is fitted onto the countershaft 9 while being meshed with the output gear 5 so that a torque of the ring gear R is delivered to the countershaft 9. A second motor (referred to as "MG2" in FIG. 1) 11 is arranged parallel to the intermediate shaft 7 and the countershaft 9, and a drive gear 13 fitted onto a rotor shaft 12 of the second motor 11 is meshed with the driven gear 10 so that a torque of the second motor 11 is added to a torque delivered from the output gear 5.

A coupling 14 in which relative rotational speeds therein are controllable is arranged coaxially with the countershaft 9. The coupling 14 is adapted to transmit a torque between a drive member and a driven member through an appropriate medium while causing a relative rotation. For example, a torque converter having a torque multiplying function and a powder clutch may be used as the coupling 14, and in the gear train shown in FIG. 1, a fluid coupling is used as the coupling 14. In the coupling 14, specifically, a pump impeller 15 as a drive member and a turbine runner 16 as a driven member are opposed to each other, and the turbine runner 16 is rotated by a spiral flow of fluid (i.e., oil) created by the pump impeller 15 to transmit a torque therebetween. In order to control a speed difference between the pump impeller 15 and the turbine runner 16 and to restrict a relative rotation between the pump impeller 15 and the turbine runner 16, a lockup clutch 17 is interposed between the pump impeller 15 and the turbine runner 16, and a damper 18 is disposed in tandem with the lockup clutch 17. For example, a friction clutch may be used as the lockup clutch 17. The lockup clutch 17 is allowed to transmit torque when engaged, and torque transmission through the lockup clutch 17 is interrupted when the lockup clutch 17 is disengaged. In addition, the lockup clutch 17 may also so transmit the torque while causing a slip, and a slip speed thereof may also be controllable.

Figure 2:
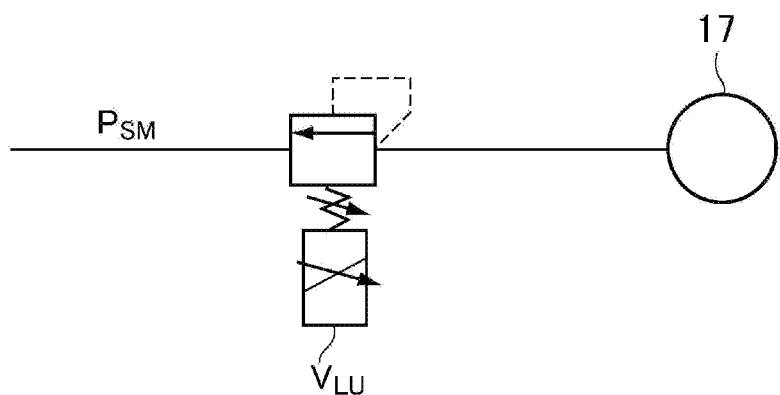
FIG. 2 is a schematic illustration showing an example of a hydraulic control circuit for a lockup clutch.

One example of a hydraulic circuit for manipulating the lockup clutch 17 is schematically shown in FIG. 2. In order to apply hydraulic pressure to the lockup clutch 17 and the coupling 14, a hydraulic pressure established by the oil pump 8 is regulated to a line pressure by a primary regulator valve (not shown). A drain pressure of the primary regulator valve is regulated to a modulator pressure $P_{SM}$ by a secondary regulator valve (not shown), and applied to the lockup clutch 17 and the coupling 14. A lockup control valve $V_{LU}$ is disposed on an oil passage for delivering the modulator pressure $P_{SM}$ to the lockup clutch 17. For example, a linear solenoid valve may be used as the lockup control valve $V_{LU}$, and the pressure applied to the lockup clutch 17 may be switched between a high pressure level and a low pressure level by altering a regulation level of the lockup control valve $V_{LU}$ between a high level and a low level. A discharging amount of the oil from may also be controlled by the lockup control valve $V_{LU}$. That is, a slip of the lockup clutch 17, in other words, a speed difference in the coupling 14 is controlled by lockup control valve $V_{LU}$.

Turning back to FIG. 1, the countershaft 9 is connected to the pump impeller 15, and the turbine runner 16 is connected to a drive gear 19 fitted onto the countershaft 9 while being meshed with a ring gear 21 of a differential gear unit 20 as a final reduction. A drive force delivered to the differential gear unit 20 is distributed to right and left drive wheels 22. To this end, in the gear train shown in FIG. 1, the coupling 14 is disposed on a torque transmission route between the output gear 5 and the drive wheels 22. It is to be noted that the coupling 14 and the differential gear unit 20 are situated in the right side of FIG. 1 for the sake of illustration.

Electricity generated by the first motor 4 is supplied to the second motor 11 to operate the second motor 11 as a motor, and an output torque of the second motor 11 is added to the torque delivered from the output gear 5. For this purpose, the first motor 4 and the second motor 11 are electrically connected to each other through a power source 24 including an inverter 23 and a battery 24. For example, a three-phase synchronous motor may be used individually as the first motor 4 and the second motor 11.

Figure 3:
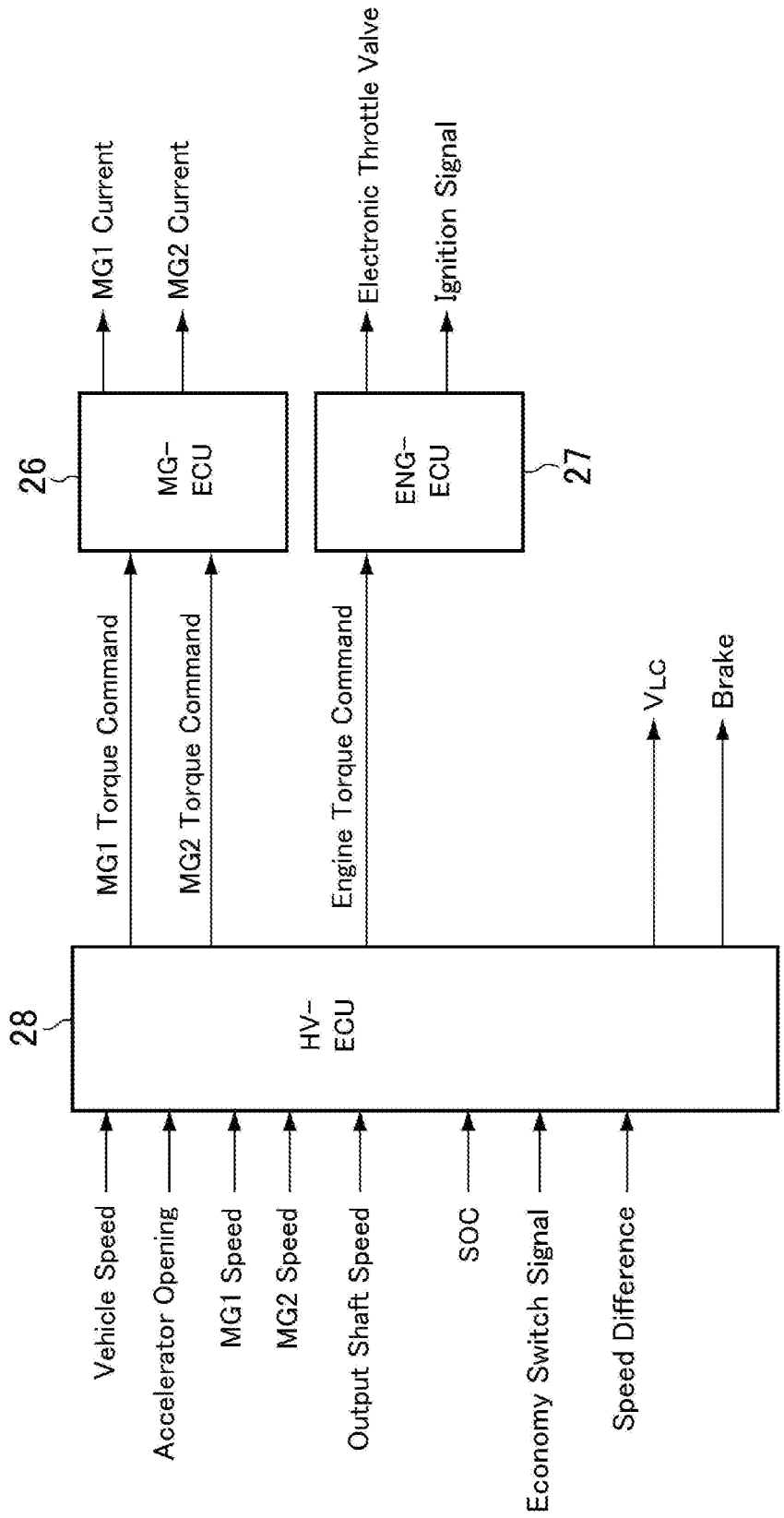
FIG. 3 is a block diagram showing a control system of the hybrid vehicle.

A control system of the hybrid vehicle is shown in FIG. 3. In order to control current supply to the first motor 4 and the second motor 11, the hybrid vehicle is provided with a motor control unit (as will be called the "MG-ECU" hereinafter) 26. In addition, in order to control an opening degree of an electronic throttle valve, an ignition timing and so on of the engine 1, the hybrid vehicle is provided with an engine control unit (as will be called the "EG-ECU" hereinafter) 27. Each of the MG-ECU 26 and the EG-ECU 27 is an electronic control unit composed mainly of a microcomputer configured to carry out a calculation based on incident data or signals, and transmit a calculation result in the form of command signal.

The hybrid vehicle is further provided with a hybrid control unit (as will be called the "HV-ECU" hereinafter) 28. The HV-ECU 28 is also an electronic control unit composed mainly of a microcomputer configured to carry out a calculation based on incident data or signals, and transmit a calculation result in the form of command signal. For example, the HV-ECU 28 receives information about a vehicle speed, an opening degree of an accelerator, a speed of the first motor 4, a speed of the second motor 11, a speed of the output shaft (e.g., the countershaft 9), a state of charge (to be abbreviated as the "SOC" hereinafter) level of the battery 24, a status of an economy switch, a speed difference in the coupling 14 and so on. Meanwhile, the HV-ECU 28 transmits torque commands to the MG-ECU 26 to control torques of the first motor 4 and the second motor 11, and a torque command to the EG-ECU 27 to control a torque of the engine 1. In addition, the HV-ECU 28 transmits a command signal to the lockup control valve $V_{LU}$ to control a torque transmitting capacity of the lockup clutch 17 (i.e., a speed difference in the coupling 14), and a command signal to the brake 2 to engage and disengage the brake 2. Accordingly, the MG-ECU 26, the EG-ECU 27, and the HV-ECU 28 serve as a controller of the embodiment.

Figures 4, 5:
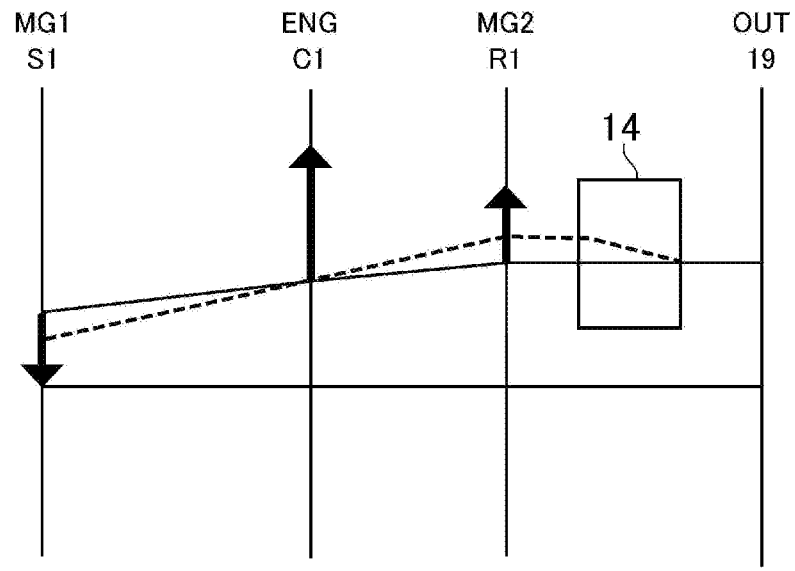
FIG. 4 is a table showing conditions of a brake and motor-generators in each operating mode.
FIG. 5 is a nomographic diagram showing conditions in a hybrid mode.

As indicated in FIG. 4, an operating mode of the hybrid vehicle is shifted by manipulating the brake 2, the first motor 4, and the second motor 11. In an electric vehicle mode (to be abbreviated as the "EV mode" hereinafter), the hybrid vehicle is propelled without using a drive force generated by the engine 1 in both forward direction and reverse direction. Specifically, the EV mode may be selected from a single-motor mode in which only the second motor 11 is operated as a motor, and a dual-motor mode in which both of the first motor 4 and the second motor 11 are operated as a motor. In order to propel the hybrid vehicle in the dual-motor mode, a rotation of the output shaft of the engine 1 or the carrier C connected thereto is stopped by engaging the brake 2. In a hybrid mode (to be abbreviated as the "HV mode" hereinafter), the hybrid vehicle is propelled by drive forces generated by the engine 1, the first motor 4, and the second motor 11 in both forward direction and reverse direction. In the HV mode, specifically, the first motor 4 is operated as a generator to control a speed of the engine 1, and electricity generated by the first motor 4 is supplied to the second motor 11 to operate the second motor 11 as a motor.

Conditions of the power split mechanism 3 and the coupling 14 during forward propulsion in the hybrid mode are shown in FIG. 5. In this situation, as indicated by arrows in FIG. 5, the engine 1 generates a forward torque, the first motor 4 is rotated in the forward direction to generate electricity while establishing a negative torque, and the second motor 11 is operated as a motor to generate a forward torque by the electricity generated by the first motor 4. In this situation, a speed of the engine 1 is changed in accordance with a speed of the first motor 4. Specifically, during normal propulsion, the speed of the engine 1 is controlled by the first motor 4 along an optimum fuel efficient curve to improve combustion efficiency or energy efficiency. In this situation, if the lockup clutch 17 is engaged completely, the pump impeller 15 connected to the countershaft 9 and the turbine runner 16 connected to the drive gear 19 are rotated at a same speed. By contrast, if the lockup clutch 17 is disengaged or allowed to cause a slip, a rotational speed of the countershaft 9 connected to the pump impeller 15 is increased higher than that of the turbine runner 16 connected to a drive gear 19. Consequently, a power loss is caused in the coupling 14.

During forward propulsion while controlling the engine speed by the first motor 4 serving as a generator as shown in FIG. 5, a frictional power loss is caused inevitably by rotations of the sun gear S, the ring gear R, and the carrier C of the power split mechanism 3. In addition, an energy loss is also caused by an electrical conversion resulting from supplying the electricity generated by the first motor 4 to the second motor 11, or accumulating the electricity generated by the first motor 4 into the battery 24. Such energy loss in the power split mechanism 3 is increased with an increase in the rotational speed of the first motor 4 rotated together with the sun gear S, and reduced when the rotation of the first motor 4 and the sun gear S is stopped. In the gear train shown in FIG. 1 in which the planetary gear unit is used as the power split mechanism 3, an operating point at which the first motor 4 is stopped together with the sun gear S is called a "mechanical point". In general, an energy efficiency of the power split mechanism 3 is improved by operating the power split mechanism 3 at a point close to the mechanical point, in comparison with the energy efficiency of a case in which the power split mechanism 3 is operated a point away from the mechanical point. Here, it is to be noted that an operating condition of the power split mechanism 3 in which the power loss is minimized differs depending on characteristics of the motor and a structure of the gear train including the planetary gear unit. That is, the power loss of the power split mechanism 3 may also be minimized when operated at a point other than the mechanical point.

A part of the engine torque outputted from the output gear 5 through the power split mechanism 3 may be called a "direct torque", and the torque of the second motor 11 is added to the direct torque to be delivered to the drive wheels 22 via the countershaft 9, the coupling 14, and the differential gear unit 20. As described, if the lockup clutch 17 is engaged completely, the coupling 14 transmits torque without causing a slip so that the power loss of the coupling 14 is minimized. By contrast, if the lockup clutch 17 is disengaged to cause a differential rotation between the pump impeller 15 and the turbine runner 16 in the coupling 14, the power loss in increased thereby reducing energy efficiency. When the differential rotation is caused in the coupling 14, an operating condition (i.e., an operating point) of the power split mechanism 3 may be changed by changing a rotational speed of the output gear 5 of the power split mechanism 3. Specifically, the rotational speed of the output gear 5 integrated with the ring gear R is increased, and a rotational speed of the sun gear S connected to the first motor 4 is reduced. Consequently, the operating point of the power split mechanism 3 is shifted to the mechanical point or a point at which the power loss is minimized (as also called the "minimum loss point"). That is, the operating point of the power split mechanism 3 is shifted closer to the mechanical point or the minimum loss point with an increase in a change amount of the operating condition of the power split mechanism 3 resulting from the differential rotation in the coupling 14 (e.g, a change in the speed of the first motor 4), from the operating condition of a case in which the differential rotation is not caused in the coupling 14.

Here, the operating point is governed by a torque and a speed. Specifically, the operating point of the power split mechanism 3 is governed by a torque applied to the power split mechanism 3 or a transmission torque of the power split mechanism 3 and a speed difference in the power split mechanism 3. On the other hand, operating points of the engine 1, the first motor 4, and the second motor 11 are individually governed by a torque and a speed thereof. In the gear train shown in FIG. 1, a speed difference in the power split mechanism 3, that is, the operating point of the power split mechanism 3, and speeds of the first motor 4 and the second motor 11, that is, the operating points of the first motor 4 and the second motor 11 are changed to reduce the power loss, by allowing the coupling 14 to cause a slip to change a speed difference in the coupling 14 while keeping an engine speed to a constant speed.

Figure 6:
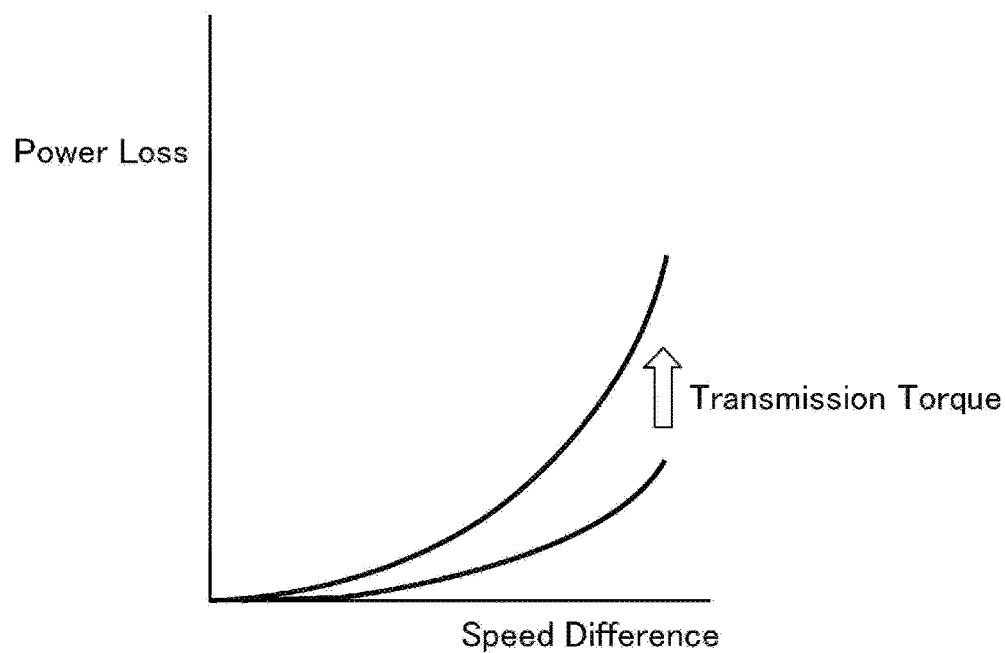
FIG. 6 is a graph indicating a relation between a speed difference in a coupling and a power loss.

A relation between the speed difference in the coupling 14 and the power loss is indicated in FIG. 6. As indicated in FIG. 6, the power loss in increased with an increase in the speed difference or the transmission torque. Here, the power loss in the coupling 14 is a difference between an input power to the pump impeller 15 and a power transmitted from the pump impeller 15 to the turbine runner 16, and a ratio between those powers is a transmission efficiency. The power loss shown in FIG. 6 may be determined in advance based on a result of experimentation or simulation using the coupling 14.

Figure 7:
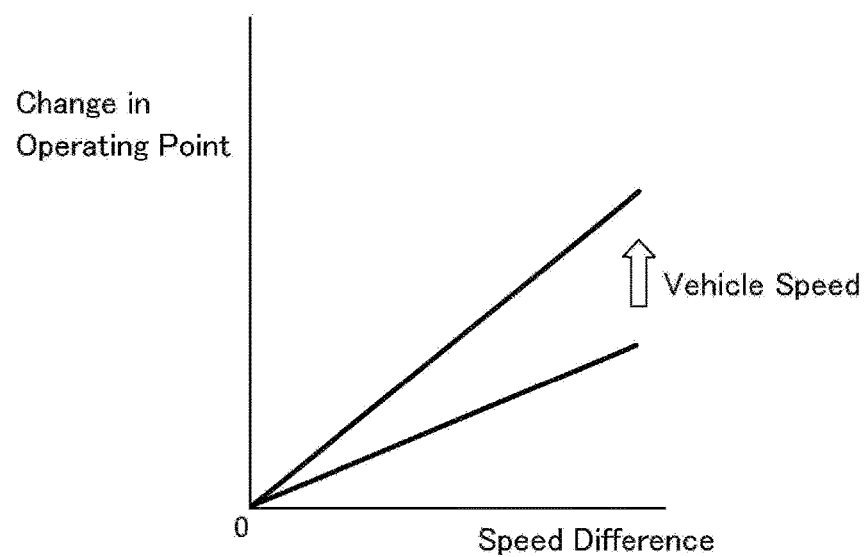
FIG. 7 is a graph indicating a relation between the speed difference and a change in an operating point of a power split mechanism.
Figure 8:
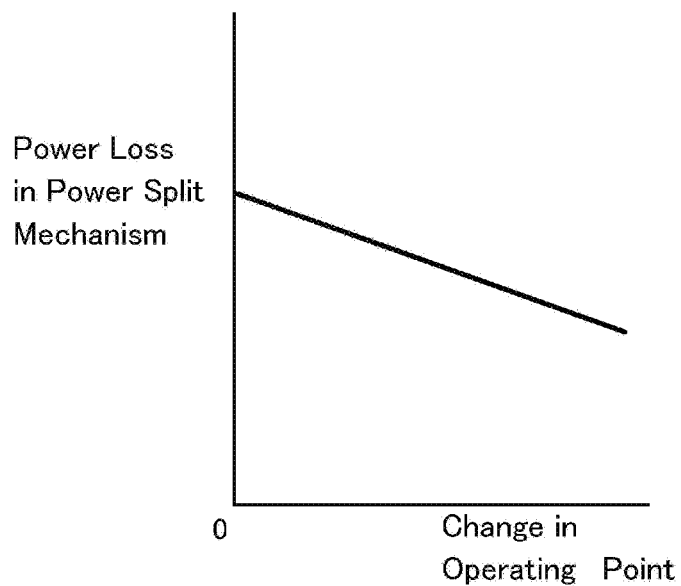
FIG. 8 is a graph indicating a relation between the speed difference and a power loss in the power split mechanism.

In the power split mechanism 3, a rotational speed of the output gear 5 connected to the ring gear R is increased with an increase in the speed difference in the coupling 14, from a speed of a case in which the relative rotation is not caused in the coupling 14. That is, the operating point is changed significantly. A relation between a change in the operating point and the speed difference in the coupling 14 is indicated in FIG. 7. As indicated in FIG. 7, a change amount of the operating point of the power split mechanism 3 is increased with an increase in the speed difference in the coupling 14 and an increase in a vehicle speed. As indicated in FIG. 8, the power loss in the power split mechanism 3 is reduced with a change in the operating point of the power split mechanism 3 toward the mechanical point. Here, the power loss in the power split mechanism 3 is a difference between an engine power applied to the carrier C and a power transmitted to the countershaft 9. The power loss includes a frictional loss in the power split mechanism 3, and an energy loss resulting from an electric consumption or an electrical conversion to operate the first motor 4 as a generator, and a power loss of the second motor 11. That is, a ratio between the engine power applied to the carrier C and a power outputted from the countershaft 9 is a transmission efficiency. The power loss in the power split mechanism 3 shown in FIG. 8 may also be determined in advance based on a result of experimentation or simulation using the power split mechanism 3, the first motor 4, and the second motor 11.

Figure 9:
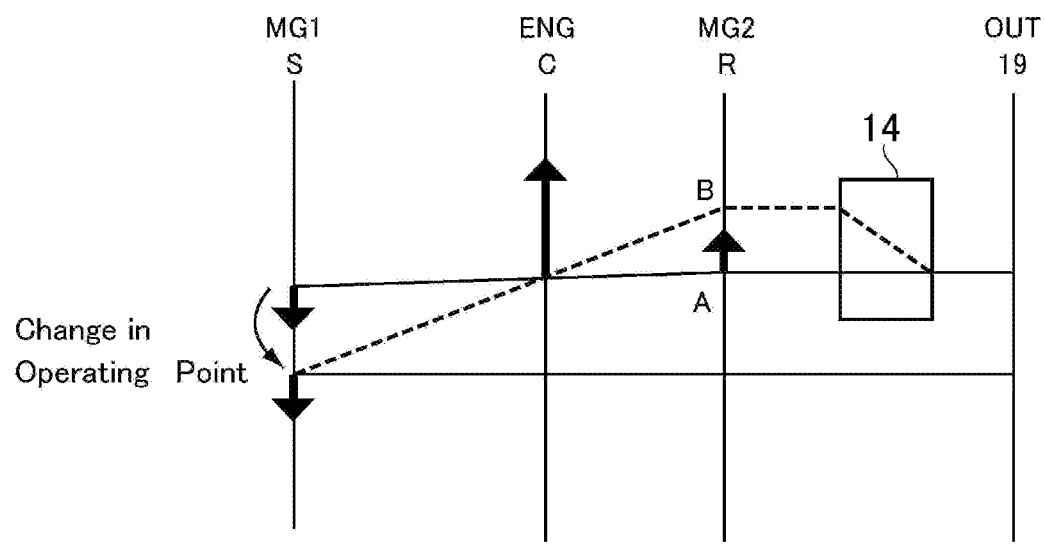
FIG. 9 is a nomographic diagram showing conditions of a case in which a differential rotation is caused in the coupling, and conditions of a case in which the operating point of the power split mechanism is changed to a mechanical point by causing a differential rotation in the coupling.

FIG. 9 shows conditions of the case in which the differential rotation is caused in the coupling 14 during forward propulsion, and conditions of the case in which the differential rotation is not caused in the coupling 14 during forward propulsion. In FIG. 9, the condition the case in which the differential rotation is caused in the coupling 14 is represented by the solid line "A", and the conditions of the case in which the differential rotation is not caused in the coupling 14 is represented by the dashed line "B". As described, the operating point of the engine 1 is governed by a speed and a torque, and as indicated in FIG. 9, the operating point of the engine 1 is maintained to a constant speed on the optimum fuel efficient curve in any of the conditions represented by the lines "A" and "B".

In the hybrid vehicle according to the embodiment, the operating condition and the power loss of the power split mechanism 3 may be controlled by controlling the speed difference in the coupling 14 disposed between the output gear 5 of the power split mechanism 3 and the drive wheels 22. The controller according to the embodiment is configured to execute a routine shown in FIG. 10 for improving energy efficiency (i.e., a fuel efficiency) of the hybrid vehicle utilizing such characteristics of the power loss.

Figure 10:
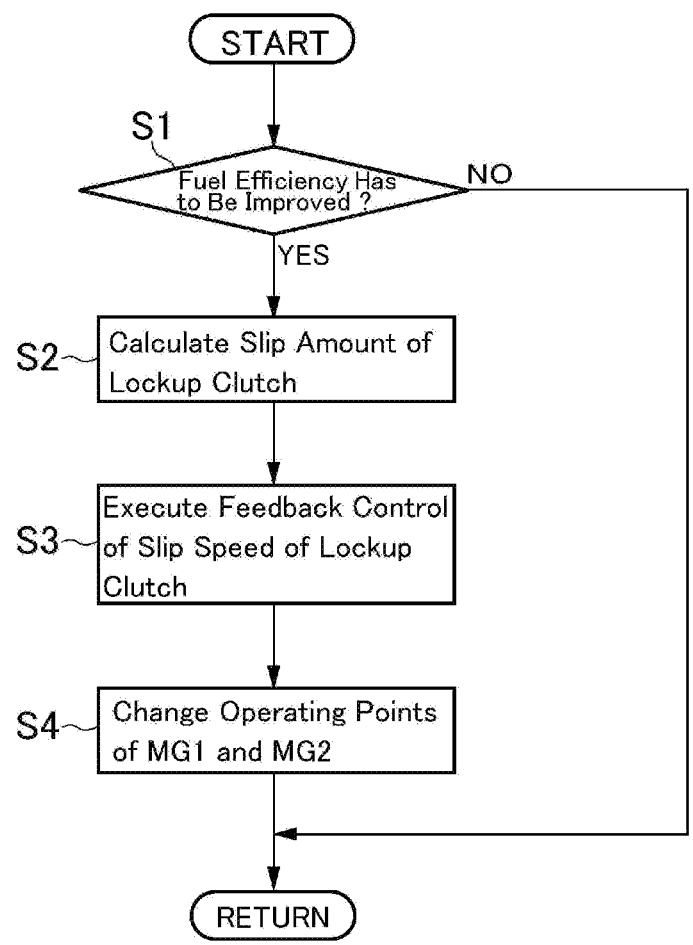
FIG. 10 is a flowchart showing one example of a routine executed by the control system.

The routine shown in FIG. 10 is executed during propulsion of the hybrid vehicle. At step S1, it is determined whether or not the fuel efficiency has to be improved. For example, when an opening degree of the accelerator is increased to increase the drive force, it is possible to select a control to improve the fuel efficiency by suppressing acceleration, and a control to enhance the acceleration while consuming the fuel. Specifically, if the economy switch is turned on, a condition to improve the fuel efficiency is satisfied. In addition, if an opening degree of the accelerator is small and the vehicle speed is substantially constant, the condition to improve the fuel efficiency is also satisfied.

If a temperature of oil (or fluid) in the coupling 14 or a temperature of oil (or fluid) for actuating the lockup clutch 17 and the brake 2 is lower than a predetermined range, the condition to improve the fuel efficiency is not satisfied. By contrast, if the temperature of the oil in the coupling 14 or the temperature of the oil for actuating the lockup clutch 17 and the brake 2 is higher than the predetermined range, the condition to improve the fuel efficiency is also not satisfied. If the condition to improve the fuel efficiency is not satisfied so that the answer of step S1 is NO, the routine returns without carrying out any specific control. In this case, a control to enhance performance of the hybrid vehicle in the HV mode, a control to propel the hybrid vehicle electrically in the EV mode and so on are executed depending on a required drive force, a vehicle speed etc. By contrast, if the condition to improve the fuel efficiency is satisfied so that the answer of step S1, the routine progresses to step S2 to calculate a slip amount of the lockup clutch 17. As described, the lockup clutch 17 is adapted to connect the pump impeller 15 as a drive member to the turbine runner 16 as a driven member. That is, the slip amount of lockup clutch 17 corresponds to speed difference in the coupling 14.

As explained with reference to FIG. 9, when the speed difference in the coupling 14 is changed, a rotational speed of the output gear 5 connected to the ring gear R of the power split mechanism 3 is changed. Consequently, the operating condition of the power split mechanism 3 is changed so that the power loss in the power split mechanism 3 is reduced. That is, as explained with reference to FIGS. 6, 7, and 8, the power loss in the coupling 14 is increased and the power loss in the power split mechanism 3 is reduced when the differential rotation is caused in the coupling 14. At step S2, specifically, a speed difference in the coupling 14 is calculated in such a manner as to minimize a total loss of the coupling 14 and the power split mechanism 3 based on the relation between the speed difference in the coupling and the losses of the coupling 14 and the power split mechanism 3. In other words, the speed difference in the coupling 14 is calculated in such a manner as to improve a total transmission efficiency of the transmission route from the engine 1 to the drive gear 19.

Specifically, the speed difference in which the total loss is minimized is a difference in which a difference between the power loss in the coupling 14 increased by the differential rotation in the coupling 14 and the power loss in the power split mechanism 3 reduced by the differential rotation in the coupling 14 is reduced close to zero as much as possible or becomes negative value. Here, if such difference becomes negative, the total loss will be decreased and hence the total energy efficiency is improved. Such speed difference to minimize the total loss and maximize the total energy efficiency may be calculated sequentially. Alternatively, such speed difference may also be determined with reference to the maps shown in FIGS. 6 to 8.

Thereafter, at step S3, a feedback control of a slip speed of the lockup clutch 17 is executed to achieve the speed difference in the coupling 14 calculated at step S2. Specifically, the speed difference in the coupling 14 is calculated by calculating a difference between a speed of the countershaft 9 and a speed of the drive gear 19 detected by sensors. To this end, the speed difference between the speed of the countershaft 9 and the drive gear 19 may be calculated based on a speed of a rotary member connected to the countershaft 9 and a speed of a rotary member connected to the drive gear 19. At step S3, specifically, the slip speed of the lockup clutch 17 is adjusted to the speed difference calculated at step S2 as a target value by controlling an engagement pressure of the lockup clutch 17 by the lockup control valve $V_{LU}$. Here, the slip amount of the lockup clutch 17, that is, the speed difference in the coupling 14 is also changed by the input torque, therefore, a torque or a speed of the second motor 11 may also be controlled in addition to the engagement pressure of the lockup clutch 17. For example, if the speed difference in the coupling 14 cannot be adjusted to the target value by disengaging the lockup clutch 17 completely, the speed difference in the coupling 14 is adjusted to the target value by changing the speed of the pump impeller 15 by the second motor 11. For this purpose, the second motor 11 is driven by supplying the electricity from the battery 24. In this case, the speed difference in the coupling 14 is adjusted to the target value by the second motor 11 if a fuel saving amount is greater than an electrical consumption, that is, if the energy efficiency can be improved.

As explained with reference to FIG. 9, when the speed difference in the coupling 14 is changed, the operating condition of the power split mechanism 3 is changed. Specifically, a rotational speed of the sun gear S connected to the first motor 4, and a rotational speed of the ring gear R connected to the second motor 11 are changed by maintaining the operating point of the engine 1 to the optimum fuel efficient point at a current vehicle speed. At step S4, therefore, the rotational speed of the first motor 4 and the rotational speed of the second motor 11 are adjusted to speeds governed by the speed difference in the coupling 14. Thereafter, the routine returns. Specifically, the operating condition or the operating point of the power split mechanism 3 is changed by a change in the speed of the first motor 4. At step S4, therefore, at least the rotational speed (i.e., the operating point) of the first motor 4 is changed.

Figure 11:
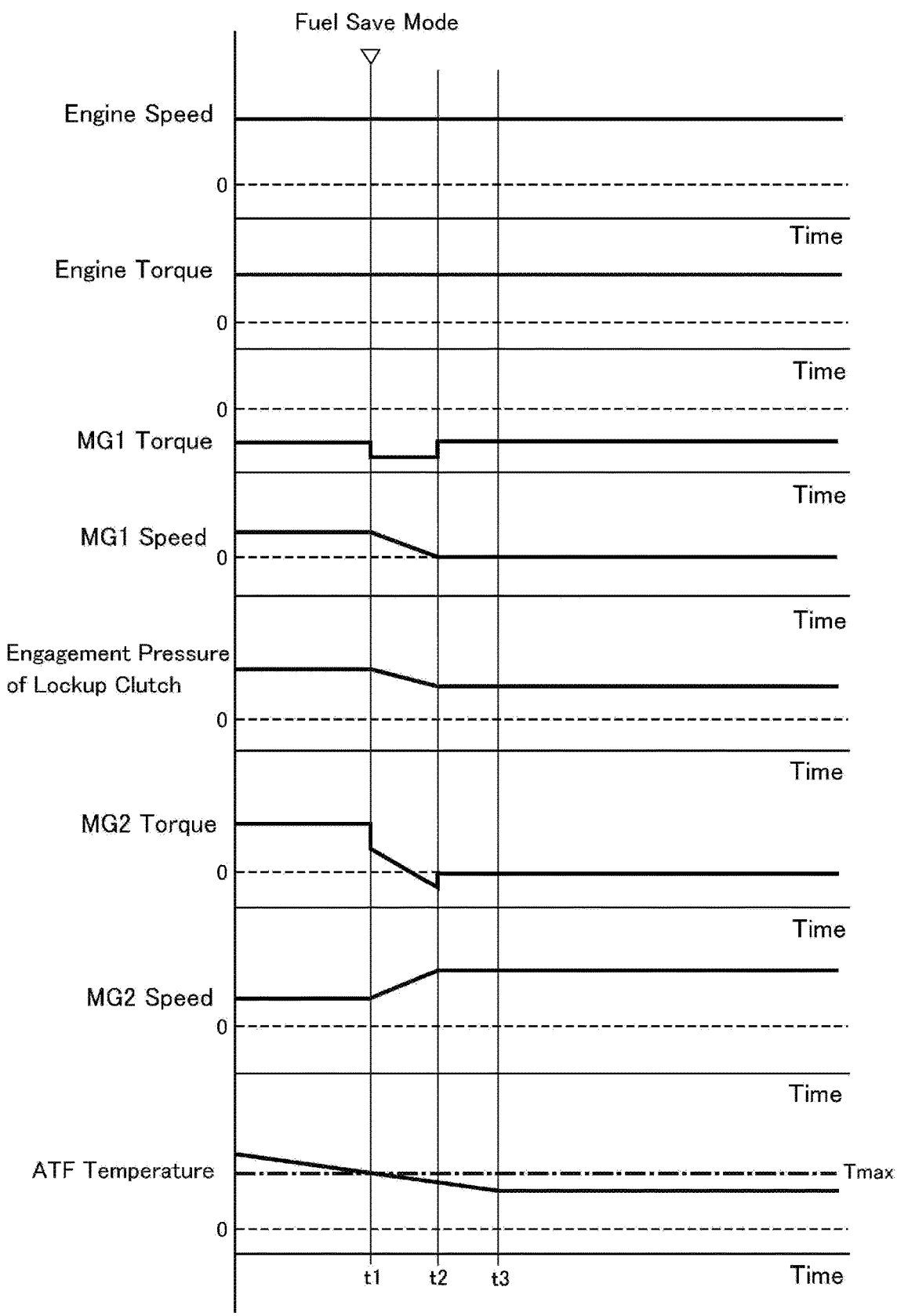
FIG. 11 is a time chart showing temporal changes in speeds and torques of the engine and the motors, and hydraulic pressures applied to the lockup clutch, and a fluid temperature in the coupling during execution of the routine shown in FIG. 10.

Temporal changes in the speed of the engine 1, the torque of the engine 1, the torque of the first motor 4, the speed of the first motor 4, the engagement pressure of the lockup clutch 17, the torque of the second motor 11, the speed of the second motor 11, and the fluid temperature in the coupling 14 during execution of the routine shown in FIG. 10 are indicated in FIG. 11. In the situation shown in FIG. 11, the engine 1 is operated at a point on the optimum fuel efficient curve before point t1. In this situation, if the fluid temperature in the coupling 14 (referred to as "ATF temperature" in FIG. 11) is higher than a threshold temperature $T_{max}$, the control to improve fuel efficiency will not be executed even if the economy switch is turned on. When the fluid temperature in the coupling 14 falls below the threshold temperature $T_{max}$ at point t1, the condition to execute the control to improve fuel efficiency is satisfied at step S1 of the routine shown in FIG. 10.

Consequently, the engagement pressure of the lockup clutch 17 is reduced to cause a differential rotation in the coupling 14 at a rate not to cause a shock. In this situation, the turbine runner 16 is subjected to a load resulting from propulsion of the hybrid vehicle, and the torque of the engine is applied to the pump impeller 15. Therefore, when a slip is caused in the lockup clutch 17, a rotational speed of the pump impeller 15 is increased thereby increasing the rotational speed of the second motor 11 connected thereto. Meanwhile, the torque of the second motor 11 is reduced.

When the differential rotation is caused in the coupling 14, a rotational speed of the ring gear R of the power split mechanism 3 is increased. In this situation, the speed and the torque of the engine 1 are maintained to current values so that the speed of the first motor 4 is reduced and a negative torque of the first motor 4 is increased. That is, the operating point of the first motor 4 and the second motor 11 are changed at step S4 of the routine shown in FIG. 10.

As described, the speed difference in the coupling 14, and the torques and the speeds (i.e., the operating points) of the first motor 4 and the second motor 11 are controlled in such a manner that a reduction amount of the power loss in the power split mechanism 3 exceeds an increase in the power loss in the coupling 14. When the speed difference in the coupling 14 reaches the target value at point t2, the torque of the second motor 11 is reduced to zero. Specifically, the speed difference in the coupling 14 is controlled in such a manner as to stop the generation of the first motor 4 by reducing the rotational speed of the sun gear S of the power split mechanism 3 to zero. In other words, the speed difference in the coupling 14 is controlled in such a manner the power split mechanism 3 is operated at the mechanical point. In this situation, therefore, the electricity is not supplied to the second motor 11 and hence the torque of the second motor 11 is reduced to zero.

In this situation, the fluid in the coupling 14 is heated by a shearing force and agitation force applied thereto during torque transmission. Consequently, at point t3, the temperature of the fluid stays at a level at which a heat generation amount and a radiation amount are balanced. During execution of the control to reduce the power loss or to improve the transmission efficiency, the operating point of the engine 1 is maintained to the optimum fuel efficient curve, and the engine torque and the engine speed are maintained substantially constant before and after execution of the control.

Thus, as a result of controlling the speed difference in the coupling 14 (or the slip amount of the lockup clutch 17) while controlling the operating point of the power split mechanism 3 (or the first motor 4 or the second motor 11), the power loss is increased in the coupling 14 by the differential rotation thereof. However, such power loss in the coupling 14 is compensated by reducing the power loss in the power split mechanism 3 so that the total loss is reduced. According to the embodiment of the present disclosure, therefore, fuel efficiency or electric efficiency can be improved by thus improving the power transmission efficiency in the hybrid vehicle.

Although the above exemplary embodiment of the present disclosure has been described, it will be understood by those skilled in the art that the present application should not be limited to the described exemplary embodiment, and various changes and modifications can be made within the spirit and scope of the present disclosure. For example, a double-pinion planetary gear unit or a complex planetary gear unit may also be used as the power split mechanism.

What is claimed is:

1. A control system for a hybrid vehicle, comprising:
   a power split mechanism that performs a differential action among a first rotary element, a second rotary element, and a third rotary element;
   an engine that is connected to the first rotary element;
   a first motor that is connected to the second rotary element;
   a second motor that is connected to the third rotary element; and
   drive wheels to which a torque is delivered from the third rotary element;
   a coupling comprising a drive member to which the torque of the third rotary element is applied and a driven member that delivers the torque to the drive wheels, in which a speed difference between the drive member and the driven member can be controlled; and
   a controller that controls the first motor, the second motor, and the coupling, wherein
   the controller is configured to change the speed difference in the coupling, and change a speed or a torque of at least one of the first motor and the second motor with changing the speed difference in the coupling, and
   the controller is further configured to control the first motor in such a manner that a rotational speed of the second rotary element is reduced to zero with changing of the speed difference in the coupling.

2. The control system for a hybrid vehicle as claimed in claim 1, wherein the controller is further configured to change the speed difference in the coupling and the speed or the torque of at least one of the first motor and the second motor in such a manner that a total efficiency of:
   a power transmission efficiency of the coupling changed by changing the speed difference therein; and
   a power transmission efficiency of the power split mechanism changed by a change in an operating condition thereof resulting from changing the speed difference in the coupling, is improved from the prior total efficiency before the operating condition of the power split mechanism is changed by the change in the speed difference in the coupling.

3. The control system for a hybrid vehicle as claimed in claim 2,
   wherein the coupling includes a fluid coupling having a frictional lockup clutch that connects the drive member to the driven member, and
   wherein the controller is further configured to control the speed difference in the coupling by causing a slip in the lockup clutch.

4. The control system for a hybrid vehicle as claimed in claim 1,
   wherein the engine can be operated along an optimum fuel efficient curve, and
   wherein the controller is further configured to change the speed or the torque of the first motor while maintaining an operating point of the engine on the optimum fuel efficient curve.

5. The control system for a hybrid vehicle as claimed in claim 1,
   wherein the hybrid vehicle comprises a countershaft to which the torque is delivered from the third rotary element, and a final reduction that distributes the torque to the right drive wheel and the left drive wheel, and
   wherein the coupling is disposed coaxially with the countershaft between the countershaft and the final reduction.

6. The control system for a hybrid vehicle as claimed in claim 1, wherein the controller is further configured to execute the control when a hybrid mode is selected.

* * * * *